United States Patent [19]

Nilssen

[11] Patent Number: 4,997,188

[45] Date of Patent: Mar. 5, 1991

[54] DIVIDED-PAYING TRAVELERS CHECKS AND SYSTEM

[76] Inventor: Ole K. Nilssen, Caesar Dr., Barrington, Ill. 60010

[21] Appl. No.: 537,141

[22] Filed: Jun. 13, 1990

Related U.S. Application Data

[63] Continuation of Ser. No. 305,543, Feb. 3, 1989, abandoned, which is a continuation-in-part of Ser. No. 118,000, Nov. 9, 1987, abandoned.

[51] Int. Cl.⁵ .................. A63B 71/00; G06F 15/20
[52] U.S. Cl. ........................ 273/138 R; 273/138 A; 364/408
[58] Field of Search .............. 273/138 R, 138 A; 434/107; 364/408, 412

[56] References Cited

PUBLICATIONS

"Scarne's New Complete Guide to Gambling" by John Sarne, pub. Simon & Schuster, ©1961, 1974, p. 146 relied on (273-138 R).
"Financial Tools Used in Money Management" by Joyce Pitts, pub. U.S. Dept. of Agriculture, Oct. 1986, pp. 2 and 2.3-2.5.

Primary Examiner—William H. Grieb
Assistant Examiner—Raleigh W. Chiu

[57] ABSTRACT

A financial institution, such as a bank, issues numerous uniquely coded travelers checks to various individual entities in exchange for value received. The holder of each travelers check in entitled to receive a certain average rate of income from the dollar-value represented by that check; which average rate of income would generally be proportional to prevailing interest rate as well as to the dollar-value represented by the check. To avoid the relatively high transaction costs associated with periodic payments of a relatively modest income to the holder of each of numerous individual checks, a statistical method is used. By way of this statistical method, a relatively few of the numerous uniquely coded travelers checks are randomly chosen at the end of each of a continuous sequence of time periods, and all the income attributable to all the issued travelers checks for the associated time period is then paid to the holders of the relatively few travelers checks chosen for that time period.

38 Claims, 1 Drawing Sheet

DIVIDED-PAYING TRAVELERS CHECKS AND SYSTEM

RELATED APPLICATION

This application is a continuation of Ser. No. 305,543, filed Feb. 3, 1989 now abandoned which is a continuation-in-part of Ser. No. 118,000 filed Nov. 9, 1987, now abandoned.

BACKGROUND OF THE INVENTION

1. Field of the Invention

The present invention relates to travelers checks and a system for making such travelers checks more valuable to the holders thereof.

2. Description of Prior Art

Travelers checks constitute familiar financial instruments. A person desiring to purchase one or more travelers checks simply goes to the local bank, signs a form, and obtains the desired travelers check(s).

The business of issuing travelers checks is a highly profitable one for the issuing entity. This is so for the main reason that, on the average, the issued travelers checks remain un-redeemed for a substantial period of time; during which time the issuing agency derives interest income from the cash having been tendered for the issued but not-yet-redeemed checks.

For instance, American Express Company of New York, N.Y.—which is the largest issuer of travelers checks in the USA—reportedly carries a float of several billion dollars resulting from issued by as-yet-unredeemed travelers checks. At an interest rate of 10% p.a., a profit of several hundred million dollars per year is indicated.

SUMMARY OF THE INVENTION

Objects of the Invention

A general object of the present invention is the provision of a system for issuing and administering travelers checks that would represent increased value for the holders of such checks.

A more specific object is the provision of a system for providing travelers checks that yield interest to the holders thereof, yet without incurring substantial transaction costs.

These as well as other objects, features and advantages of the present invention will become apparent from the following description and claims.

Brief Description

A financial institution, such as a bank, issues a large number of uniquely coded travelers checks to various individual entities in exchange for values received. Each travelers check is identified as representing a specific monetary value. The holder of each travelers check in entitled to receive a certain average rate of income from the dollar value represented by that check; which average rate of income would generally be proportional to prevailing interest rate as well as to the dollar value represented by the check.

To avoid the relatively high transaction costs associated with periodic payments of a relatively modest amount of income to the holders of each of the numerous uniquely coded travelers checks, a statistical method is used. By way of this statistical method, a relatively few travelers checks are randomly chosen at the end of each of a continuous sequence of time periods, and all the income attributable to all the issued travelers checks for the associated time period is then paid to the holders of the relatively few travelers checks chosen for that time period.

Thus, each holder of a travelers check will, on a probabilistic basis, receive an income from that check.

As a result, a travelers check becomes a much more attractive financial instrument: attractive to hold for the relatively high probabilistic yield as well as for the convenience generally associated with a travelers check.

More particularly, subject travelers checks and system comprise the following key steps and component parts:

(1) a central issuing entity operative, in return for value received, to issue to each of various individual entities a number of uniquely coded travelers checks, thereby in total having issued a large number of such checks;

(2) a utilization entity functionally connected with the central issuing entity and operative to utilize the values received by this central issuing entity and to generate a rate of income of additional values, this rate of income cumulating and providing for a disbursement fund; and (3) a random-choice and disbursement entity functionally connected with the central issuing entity, the utilization entity, and the various individual entities, the random-choice and disbursement entity being operative for each of plural time periods to randomly choose one of the large number of uniquely coded travelers checks and to make a relatively large disbursement from the disbursement fund to the individual entity holding the chosen check.

DESCRIPTION OF THE PREFERRED EMBODIMENT

Details of Construction

Figure 1:
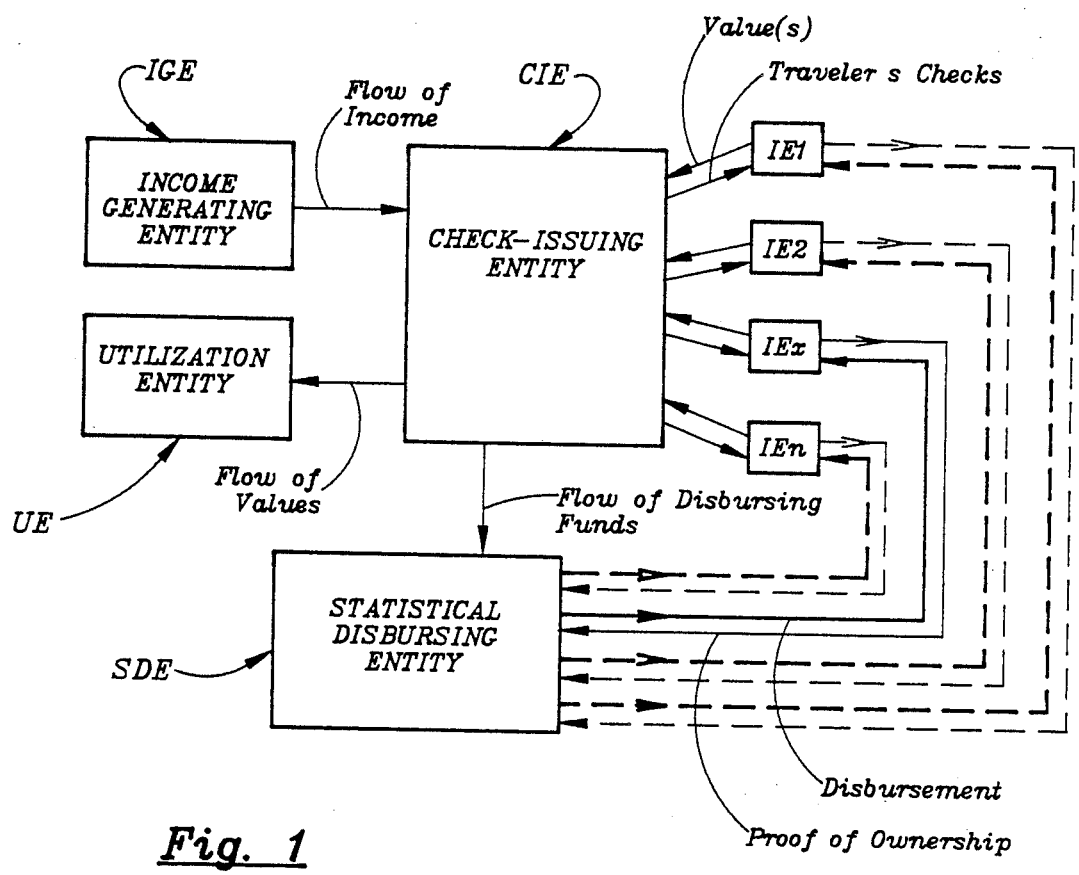
FIGURE 1 diagrammatically illustrates the preferred embodiment of the invention.

FIGURE 1 is a combination systems-process diagram that illustrates the system operative to effectuate the process of the present invention.

In FIGURE 1, numerous individual entities are identified as IE1, IE2 ... IEx ... IEn; each of which numerous individual entities—at one time or another—is operationally connected with a check-issuing entity CIE as well as with a statistical disbursing entity SDE. The check-issuing entity CIE is operationally connected with an income-generating entity IGE and a utilization entity UI as well as with the statistical disbursing entity SDE.

Details of Operation

Numerous individual entities (IE1/IE2/IEx/IEn) will, at one time or another, interact with the check-issuing entity CIE in such manner as to convey to it one or more units of value in exchange for one or more uniquely coded travelers checks. Each such uniquely coded travelers check is identified in a manner that reflects the amount of value for which it was exchanged.

The check-issuing entity CIE keeps account of all the uniquely coded travelers checks exchanged by it in return for values received from the various individual entities; and transmits information with respect to key characteristics of these travelers checks, such as identification code and value denominations, to the statistical disbursing entity SDE.

The check-issuing entity CIE conveys to the utilization entity UE the values it has received in exchange for travelers checks; while it receives a flow of income from the income-generating entity IGE. At least part of this flow of income is conveyed to the statistical disbursing entity SDE to be placed into a disbursement fund.

Periodically and repeatedly, preferably once each week, the statistical disbursing entity SDE randomly selects the identification codes of a relatively few of the numerous issued travelers checks and accredits each chosen identification code with a substantial amount of funds from the disbursement fund. Thereafter, the statistical disbursing entity arranges to inform the holders of the issued travelers checks with respect to the chosen identification codes and the amount of funds accredited thereto.

Upon verification to such effect, each holder of a travelers check bearing one of the chosen identification codes is entitled to obtain from the statistical disbursing entity the total amount of funds accredited to the identification code of that check.

Thus, the process of randomly choosing a few identification codes and making a substantial disbursement to each of the holders of the travelers checks bearing the chosen codes is carried out on a substantially continuous basis; which means that each individual travelers check represents a continuously repeating opportunity to receive a substantial disbursement of funds.

In the preferred embodiment, the rate of funds disbursed by the statistical disbursing entity to the holders of travelers checks is such as, on the whole, to represent a fair return on the values exchanged therefor; which is to say that, on a statistical basis, each travelers check, regardless of its denomination, earns an interest substantially commensurate with its face value as well as with the currently prevailing interest rate.

The value associated with a travelers check might be as low as equivalent to about $10.00. To cost-effectively permit the holders of such low-value travelers checks to gain a relatively high rate of return, only one out of one million travelers checks would be chosen each week; and the chosen one-in-a-million check would receive the total interest earned by the funds received for one million such low-value checks for one week. At an annual interest rate of 10%, the weekly earnings on one million such low-value checks would be about $20,000; which would then be the pay-out associated with the one low-value travelers check chosen each week.

Of course, with respect to travelers checks of higher value, correspondingly higher pay-outs, and/or higher chances for being chosen for pay-outs, would prevail.

Additional Comments (a) To a person of ordinary skill in the arts most nearly relevant hereto, it will be clear that all the functions associated with the various functional blocks of the systems-process block diagram of FIGURE 1 may be performed by automatic means, such as by way of pre-programmed computer and dispenser means. For instance, an automatic teller machine may accept small dollar amounts from an individual entity or person and issue to him receipts and/or travelers checks in exchange therefor—each receipt and/or travelers check having a unique identification code.

Alternatively, some or all of the various functions may be accomplished by persons of ordinary skills by simply following clearly specifiable procedures.

(b) It is expected that the check-issuing entity will, by way of the utilization entity, invest the revenues received from the sale of travelers checks in various large blocks of income-producing financial instruments, such as large-denominations government bonds, shares of corporate capital stock, shares of or in mutual funds, etc.

(c) The income-generating entity (IGE) and the utilization entity (UE) may be one and the same, namely one or more profit-producing organizations, such as industrial corporations, mutual funds, etc. The flow of income to the money-issuing entity (MIE) would then come from the profits of those profit-producing organizations.

(d) After a very large number of travelers checks have been issued, to provide for an increased level of perceived value (such as by providing for a significant degree of lottery-like excitement), one of the periodically chosen identification codes would be accredited with a particularly high pay-out, such as several million dollars. This increased pay-out would be counterbalanced by somewhat reduced pay-outs to the other chosen identification codes.

(e) It is anticipated that the travelers checks will be of at least two different types. One type would permit the individual owner to be specifically identified; another type would be in the form of bearer certificates requiring special coded identification for redemption by the bearer.

(f) It is also anticipated that subject Dividend-Paying Travelers Checks may be furnished in a version that is, in effect, pre-endorsed and usable as cash. As such, they would expectedly become widely accepted: becoming as liquid and tradeable as ordinary money. In effect, they would constitute interest-bearing money.

Hence, it would be reasonable to expect that a large number of people would simply prefer to convert all of their available cash funds into such Dividend-Paying Travelers Checks.

(g) In case the holder of a travelers check with a chosen identification code chooses not to or otherwise fails to collect the funds accredited to that chosen identification code, the probability of that particular identification code being chosen in the future will be adjusted upward by a factor equal to the factor by which the amount of uncollected funds exceeds the value of the chosen travelers check.

More particularly by way of example, if a given travelers check is valued at the equivalent of $10, and if at one point in time that check were chosen to be accredited with an amount of $2000, then—for as long as the accredited amount remains uncollected—this particular check would partake in future random choosings with a probability of being chosen that is 201 higher than it was before.

(h) The process herein described in connection with travelers checks may also be applied to situations wherein the funds supplied by the various individual entities (individuals) are not represented by a physical check or certificate means. Rather, the process and system is also applicable to situations where the money provided by an individual is simply turned over to the check-issuing entity (or its similar) in return for some form of receipt and placed in an account held in the name of that particular individual. Interest and/or dividends would then be paid to this individual on a statistical basis; and such interest and/or dividends would then simply be accredited to his account.

Thus, the process and system herein described is applicable to such situations as:

(1) Paying interest on passbook or similar bank savings accounts;

(2) Paying interest on balances in credit and/or debit card accounts;

(3) Paying interest on balances in personal and/or small company checking accounts;

(4) Disbursement of dividends payable on small lots of corporate capital stock;

(5) Payments of dividends and/or interest on accounts with stock brokers and/or mutual funds;

(6) Paying interest/dividends on outstanding money orders, not-yet-redeemed checks; etc.

In all these situations, by using the principle of paying dividends and/or interest by way of a statistical distribution method, a basic value to each account holder is virtual elimination of the relatively high transaction costs associated with small transactions, thereby permitting higher effective interest and/or dividends to be paid to the account holder while at the same time eliminating all the detailed record-keeping otherwise incumbent upon him. In addition, a high degree of lottery-like excitement is provided.

(i) One very important feature of the Dividend-Paying Travelers Checks herein described is that they need not be redeemable. That is, they can be made to function perfectly well without the mechanism of redemption.

This fact permits the operation associated with issuing travelers checks to include many more options in terms of investments suitable as underlayment of the requisite dividend payments.

With non-redeemable travelers checks, the value of the travelers check would be entirely based on its dividend-paying feature; which would imply that an issued travelers check will have a value that would be determined by a market mechanism, somewhat like a stock certificate. In other words, the value of such a travelers check would be apt to fluctuate somewhat; but, as long as dividend payments are upheld, it would clearly have a value.

By maintaining the dividend payments at a substantially constant level, the market value of such a travelers check would fluctuate with the interest rate.

By increasing (or decreasing) the dividend payments in accordance with the inflation rate, the market value (in dollars) of such a travelers check would increase (or decrease) accordingly.

By increasing the dividend payments at a rate higher than the inflation rate, the market value of such a travelers check would increase at a rate higher than inflation.

In any case, its utility as a travelers check would be maintained: its trading value would simply be established by market mechanisms.

Of course, the price of a travelers check from the issuer would also be determined by market mechanisms.

(j) It is believed that the present invention and its several attendant advantages and features will be understood from the preceding description. However, without departing from the spirit of the invention, changes may be made in its form and in the construction and interrelationships of its component parts, the form herein presented merely representing the preferred embodiment.

I claim:

1. An arrangement comprising:
    first means operative, in exchange for values received, to issue travelers checks to various individual entities; each of these individual entities becoming a holder of a travelers check; each travelers check: (i) bearing a unique identification code, and (ii) bearing a first signature associated with its holder;
    second means functionally connected with the first means and operative to utilize the values received such as to obtain therefrom a substantially continuous stream of profits; and
    third means functionally connected with the first and second means, the third means being operative to receive funds derived from the continuous stream of profits, to keep a record of the unique identification code of each of the issued travelers checks, and repeatedly, each time after a certain time period, to: (i) choose at random a number of the recorded identification codes; (ii) accredit an amount of funds to the holder(s) of the travelers check(s) bearing the chosen identification code(s); (iii) inform the various individual entities of the chosen identification code(s); and (iv) allocate said amount of funds to the holder(s) of the travelers check(s) bearing the chosen identification code(s), said amount of funds being substantially proportional to the profits cumulated during the certain time period.

2. The arrangement of claim 1 wherein, in order for a holder of a travelers check bearing a chosen identification code to obtain a part of said amount of allocated funds, the holder has to place a second signature onto the travelers check bearing the chosen identification code; the second signature being substantially identical to the first signature.

3. The arrangement of claim 1 wherein: (i) each travelers check is denominated in a manner that reflects proportionality to the value having been received by the first means in exchange therefor; and (ii) the holder of a travelers check bearing a chosen identification code receives a part of said amount of funds, which part being substantially proportional to the denomination thereof.

4. The arrangement of claim 1 wherein the second means utilizes at least part of the values received by way of obtaining in exchange therefor a number of income-yielding financial instruments.

5. An arrangement comprising:
    first entity operative to issue certificate means in exchange for monetary value means, an individual non-redeemable certificate means having a unique identification code and being issued in exchange for a specific but relatively small amount of monetary value means;
    plural individual entities functionally related to the first entity, each individual entity having monetary value means and being operative to transfer to the first entity said specific relatively small amount of monetary value means in exchange for an individual certificate means, thereby causing: (i) the first entity to accumulate a relatively large amount of monetary value means including the sum of numerous specific relatively small amounts of monetary value means; and (ii) the plural individual entities to obtain numerous certificate means, each having a unique identification code;

second entity functionally related to the first entity and operative to utilize the cumulated monetary value means in such manner as to obtain therefrom a substantially continuous stream of profits; and third entity functionally related to the plural individual entities as well as to the first and the second entity, the third entity: (i) receiving funds from the substantially continuous stream of profits; (ii) maintaining record of the unique identification codes of each individual certificate means issued by the first entity; (iii) having random choice means operative at the end of a period to choose randomly from among the numerous unique identification codes of record; (iv) choosing by said random choice means at least one of the numerous identification codes; (v) accrediting a substantial amount of funds to the certificate means having the chosen identification code; (vi) informing the plural individual entities of the chosen identification code; and (vii) effectively transferring possession of said substantial amount of funds to the individual entity holding the individual certificate means having the chosen identification code, said substantial amount of funds being approximately proportional to a sum of all the profits having cumulated during said period.

6. The arrangement of claim 5 wherein the certificate means is denominated in a manner proportional to the relatively small amount of monetary value means for which it was exchanged.

7. An arrangement comprising:

issuing and receiving means operable to issue a travelers check means in exchange for an amount of value received, the travelers check means being provided with a unique identification code;

plural individual entities, each operable to provide an amount of value to the issuing and receiving means and to obtain a uniquely coded travelers check means in exchange therefor, thereby bringing about a situation whereby: (i) the plural individual entities have obtained a large number of travelers check means, each having been provided with a unique identification code; and (ii) there are numerous owners of travelers check means;

utilization and revenue generating means operable to obtain from the issuing and receiving means the amounts of value received thereat, the utilization and revenue generating means being operable: (i) to utilize the amounts of value obtained from the issuing and receiving means; and (ii) to provide revenues in return therefor; and statistical disbursing means operable: (i) to receive from the receiving and issuing means information with respect to the unique identification code of each issued certificate travelers check means; (ii) to obtain revenues from the utilization and revenue generating means; (iii) to randomly select the identification code of one of the large number of issued travelers check means; (iv) to accredit that travelers check means with a certain amount of revenues; (v) to inform the numerous owners of travelers check means of the one selected identification code; and (vi) to effectively transfer ownership of the certain amount of revenues to the owner of the travelers check means having the selected identification code.

8. The arrangement of claim 7 wherein the utilization and revenue generating means utilizes at least part of aid amounts of value received by way of purchasing a number of yield-producing financial instruments.

9. The arrangement of claim 7 wherein the travelers check means is non-redeemable by the issuing and receiving means.

10. The arrangement of claim 7 wherein: (i) the utilization and revenue generating means receives a flow of revenues as a result of its utilization of said amounts of value; (ii) the statistical disbursing means receives from the utilization and revenue generating means a stream of revenues; (iii) the stream of revenues being lower in magnitude than said flow of revenues; and (iv) at least part of said flow of revenues being utilized by the utilization and revenue generating means in such manner as to increase said flow of revenues.

11. The arrangement of claim 10 wherein: (i) each travelers check means is denominated in a manner reflecting the amount of value having initially been received in exchange therefor; and (ii) is redeemable by the issuing and receiving means, but only for an amount of value equal to that having been initially received in exchange therefor.

12. The arrangement of claim 7 wherein the issuing and receiving means, the utilization and revenue generating means, and the statistical disbursing means are parts of a profit-producing organization.

13. An operational structure comprising:

first entity operative to issue certificate means in exchange for value means, an individual certificate means: (i) having a unique identification code; (ii) being issued in exchange for a specific amount of value means; and (iii) being denominated in a manner that reflects said specific amount of value means;

plural individual entities operationally connected with the first entity, each individual entity having value means and being operative to transfer to the first entity said specific amount of value means in exchange for an individual certificate means, thereby causing: (i) the first entity to receive a flow of value means; and (ii) the plural individual entities each to hold at least one of numerous individual certificate means, each having a unique identification code;

second entity, including an income-generating entity, operationally connected with the first entity, the second entity being operative: (i) to receive said flow of value means from the first entity, (ii) to accumulate said flow of value means, and (iii) to derive income from the value means so accumulated, at least part of this income being derived from interest- and/or dividend-paying financial instruments; and third entity operable: (i) to receive from the first entity information with respect to the unique identification code of each issued certificate means; (ii) to obtain funds from the second entity; (iii) at a certain time to cause random selection of the identification code of one of the issued certificate means; (iv) to accredit that certificate means with a certain amount of funds; (v) to inform the numerous holders of certificate means of the one selected identification code; and (vi) to effectively transfer ownership of the certain amount of funds to the holder of the certificate means having the selected identification code.

14. The arrangement of claim 13 wherein each individual certificate means: (i) is issued to an individual entity which thereby becomes a certificate owner, the certificate owner having an identity; and (ii) is provided with a unique marking functional to verify said identity.

15. A system comprising:
first means operative, in exchange for values received, to issue income-producing non-redeemable financial certificates to various individual entities; each of these individual entities becoming a holder of a financial certificate; each financial certificate bearing a unique identification code;
second means functionally connected with the first means and operative to utilize the values received such as to derive a stream of profits therefrom; at least part of this stream of profits being utilized by the second means in such manner as to generate additional profits, thereby to cause the total stream of profits to increase over time; and
third means functionally connected with the first and the second means; the third means being operative:
(a) to receive funds derived from the stream of profits,
(b) to keep record of the unique identification code of each of the issued financial certificates, and
(c) periodically to: (i) choose at random one of the recorded identification codes; (ii) accredit an amount of funds to the holder of the financial certificate bearing the randomly chosen identification code; (iii) inform the various individual entities of the chosen identification code; and (iv) effectively transfer possession of said amount of funds to the holder of the financial certificate bearing the chosen identification code.

16. The system of claim 15 wherein, relative to a predetermined monetary unit, the value of each financial certificate is made to increase over time.

17. The system of claim 15 wherein the second means comprises a mutual funds organization.

18. The system of claim 15 wherein the first means, the second means, and the third means are elements of a profit-producing organization.

19. A system comprising:
first means operative, in exchange for values received, to issue non-redeemable financial certificates to various individual entities; each of these individual entities becoming a holder of such a financial certificate; each financial certificate bearing a unique identification code;
second means functionally connected with the first means and operative to utilize the values received such as in effect to derive profits therefrom; at least part of these profits being utilized by the second means in such manner as to generate yet additional profits; and
third means functionally connected with the first and the second means; the third means being operative:
(a) from time-to-time to receive funds derived from the profits,
(b) to keep record of the unique identification code of each of the issued financial certificates, and
(c) from time-to-time to: (i) make a random choice of one of the recorded identification codes; (ii) accredit an amount of funds to the holder of the financial certificate bearing the randomly chosen identification code; (iii) inform the various individual entities of the chosen identification code; and (iv) effectively transfer possession of said amount of funds to the holder of the financial certificate bearing the chosen identification code;
the system being made to function such as to cause said amount of funds to increase with time.

20. The system of claim 19 wherein said random choice is made periodically.

21. A system comprising:
first means operative, in exchange for values received, to issue proofs of ownership to various individual entities; each of these individual entities becoming a holder of such a proof of ownership; each proof of ownership being identified by a unique identification code;
second means functionally connected with the first means and operative to invest at least part of the values received in income-yielding financial instruments, thereby to derive financial income therefrom; and
third means functionally connected with the first and the second means; the third means being operative:
(a) from time-to-time to receive funds derived from said financial income,
(b) to keep record of the unique identification code of each of the issued proofs of ownership, and
(c) from time-to-time to: (i) make a random choice of one of the recorded identification codes; (ii) accredit an amount of funds to the holder of the proof of ownership bearing the randomly chosen identification code; (iii) inform the various individual entities of the chosen identification code; and (iv) effectively transfer possession of said amount of funds to the holder of the proof of ownership bearing the chosen identification code.

22. The system of claim 21 further characterized by functioning such as to cause said amount of funds to increase with time.

23. The system of claim 21 further characterized by functioning such as to cause at least part of the financial income to be utilized by the second means in such manner as to generate yet additional financial income.

24. The system of claim 21 wherein each of at least part of said proofs of ownership constitutes a financial certificate manifestly providing for a space in which the holder thereof may place his signature.

25. The system of claim 21 wherein said proofs of ownership are non-redeemable.

26. The system of claim 21 wherein said financial instruments include shares of corporate capital stock, government and/or corporate bonds, and/or shares in mutual funds.

27. An arrangement comprising:
first means operative, in exchange for values received, to issue a certificate of ownership to each of various individual entities; each of these various individual entities becoming a holder of such a certificate of ownership; each certificate of ownership bearing a unique identification code;
second means functionally connected with the first means and operative to invest a substantially part of the values received in income-producing financial instruments such as to obtain therefrom a stream of financial profits; and
third means functionally connected with the first and second means; the third means being operative to receive funds derived from the stream of financial profits, to keep a record of the unique identification code of each of the issued certificates of ownership, and repeatedly, each time after a certain time period, to: (i) choose at random a number of the recorded identification codes; (ii) accredit an amount of funds to the holder(s) of the certificate(s) of ownership bearing the chosen identification code(s); (iii) inform the various individual entities of the chosen identification code(s); and (iv) allocate said amount of funds to the holder(s) of the certificate(s) of ownership bearing the chosen identification code(s).

28. The arrangement of claim 27 further characterized by being functional to cause said amount of funds to be substantially proportional to the amount of financial profits cumulated during the certain time period.

29. The arrangement of claim 27 wherein, to a substantial degree, the financial profits include dividends and/or interest payments derived from said income-producing financial instruments.

30. The arrangement of claim 27 wherein, to a substantial degree, the income-producing financial instruments include shares in one or more mutual funds.

31. The arrangement of claim 27 wherein said amount of funds is caused to increase over time.

32. The arrangement of claim 27 wherein the functions performed by said first, second and third means are made to continue for an indefinite non-limited period of time.

33. An arrangement comprising:
first means operative, in exchange for monetary values received, to assign a proof of ownership to each of various individual entities; each of these various individual entities becoming a holder of such a proof of ownership; each proof of ownership being identified via a unique identification code;
second means functionally connected with the first means and operative to invest in financial instruments at least a substantial part of the total monetary values received from the various individual entities, thereby to form a pool of financial instruments; the pool being operative to generate financial income; and
third means functionally connected with the first and the second means; the third means being operative to receive funds derived from the financial income, to maintain a record of the unique identification code of each of the assigned proofs of ownership, and to: (i) choose at random a number of the recorded identification codes; (ii) accredit an amount of funds to each of the holder(s) of the proof(s) of ownership bearing the chosen identification code(s); (iii) inform the various individual entities of the chosen identification code(s); and (iv) allocate said amount of funds to the holder(s) of the proof(s) of ownership bearing the chosen identification code(s).

34. The arrangement of claim 33 wherein: (i) the financial instruments include stocks and/or bonds; and (ii) at least part of the financial income results from dividends and/or interest derived from said stocks and/or bonds.

35. An arrangement comprising:
first means operative, in exchange for a certain amount of currency received, to issue a bearer's certificate to each of various individual entities; each of these various individual entities becoming a holder of such a bearer's certificate; and
second means functionally connected with the first means and operative to invest in financial instruments at least a substantial part of the total amount of monetary currency received from the various individual entities, thereby to form a pool of financial instruments; each of said bearer's certificates representing ownership of a portion of said pool of financial instruments; the second means being operative, by way of financial income derived from the financial instruments, to cause the monetary value of each such bearer's certificate to increase over time.

36. The arrangement of claim 35 wherein each bearer certificate is identified by way of a unique identification code.

37. The arrangement of claim 36 additionally comprising:
third means functionally connected with the first and the second means; the third means being operative to: (a) receive funds derived from the financial income; (b) maintain a record of the unique identification code of each of the bearer's certificates; (c) choose at random at least one of the recorded identification codes; (d) accredit an amount of funds to the bearer's certificate having the chosen identification code; (e) provide information to holders of bearer's certificates with respect to the chosen identification code; and (f) deliver, upon demand, said amount of funds to the holder of the bearer's certificate having the chosen identification code.

38. An arrangement comprising:
first means operative, in exchange for a certain amount of monetary currency received, to assign a proof of ownership to each of various individual entities; each of these various individual entities becoming a holder of such a proof of ownership; each proof of ownership being identified via a unique identification code;
second means functionally connected with the first means and operative to invest in financial instruments at least a substantial part of the total amount of monetary currency received from the various individual entities, thereby to form a pool of financial instruments; each of said proofs of ownership representing ownership of a portion of said pool of financial instruments; the second means being operative, by way of deriving financial income from the financial instruments, to cause the monetary value of each such portion to increase over time; and
third means functionally connected with the first and the second means; the third means being operative to receive funds derived from the financial income, to maintain a record of the unique identification code of each of the assigned proofs of ownership, and repeatedly to: (i) choose at random a number of the recorded identification codes; (ii) accredit an amount of funds to each of the holder(s) of the proof(s) of ownership bearing the chosen identification code(s); (iii) inform the various individual entities of the chosen identification code(s); and (iv) allocate said amount of funds to the holder(s) of the proof(s) of ownership bearing the chosen identification code(s).

* * * * *